Dec. 17, 1929.  J. B. SANBORN  1,740,203
PICTURE FRAME
Filed April 30, 1928   2 Sheets-Sheet 2
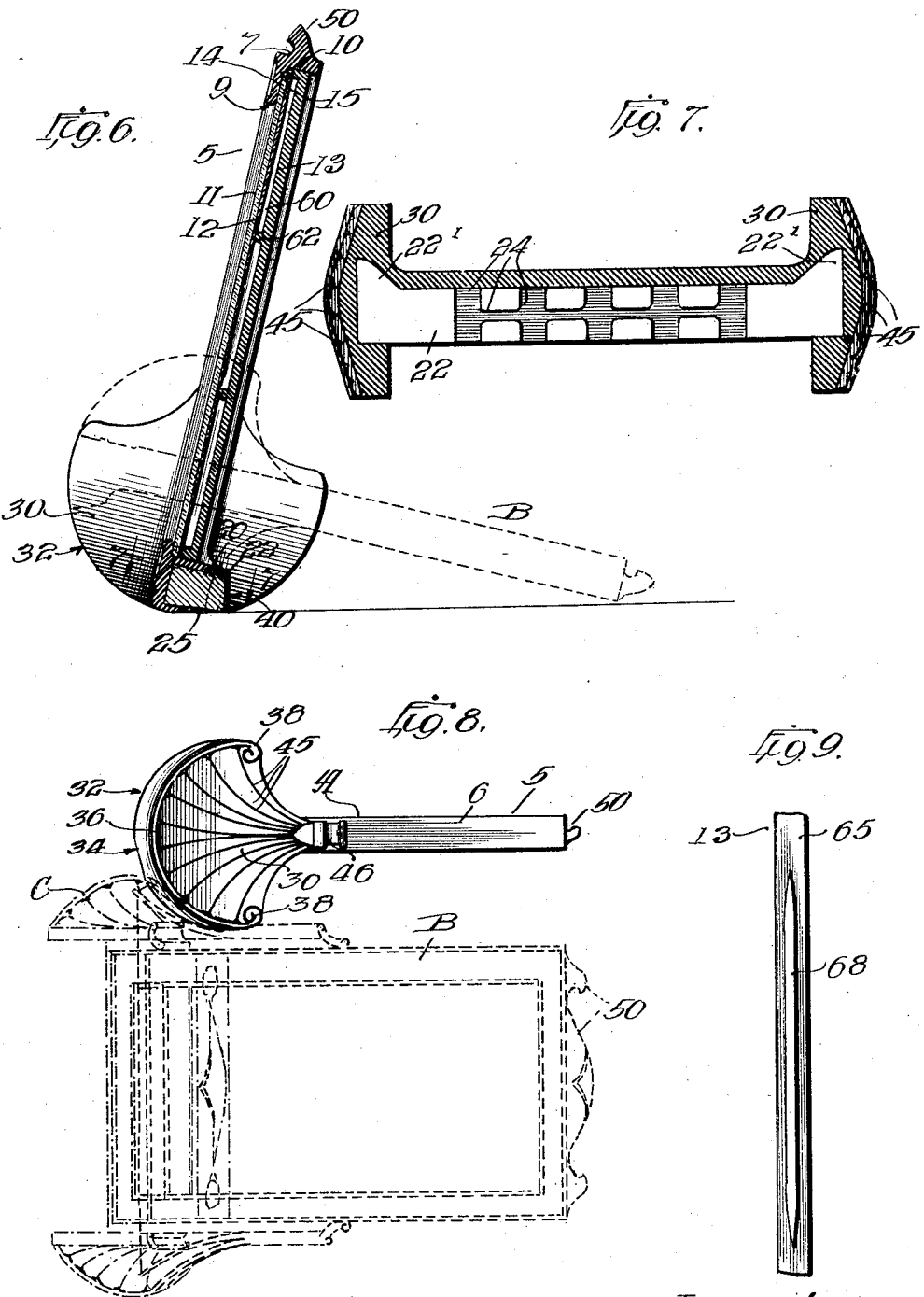

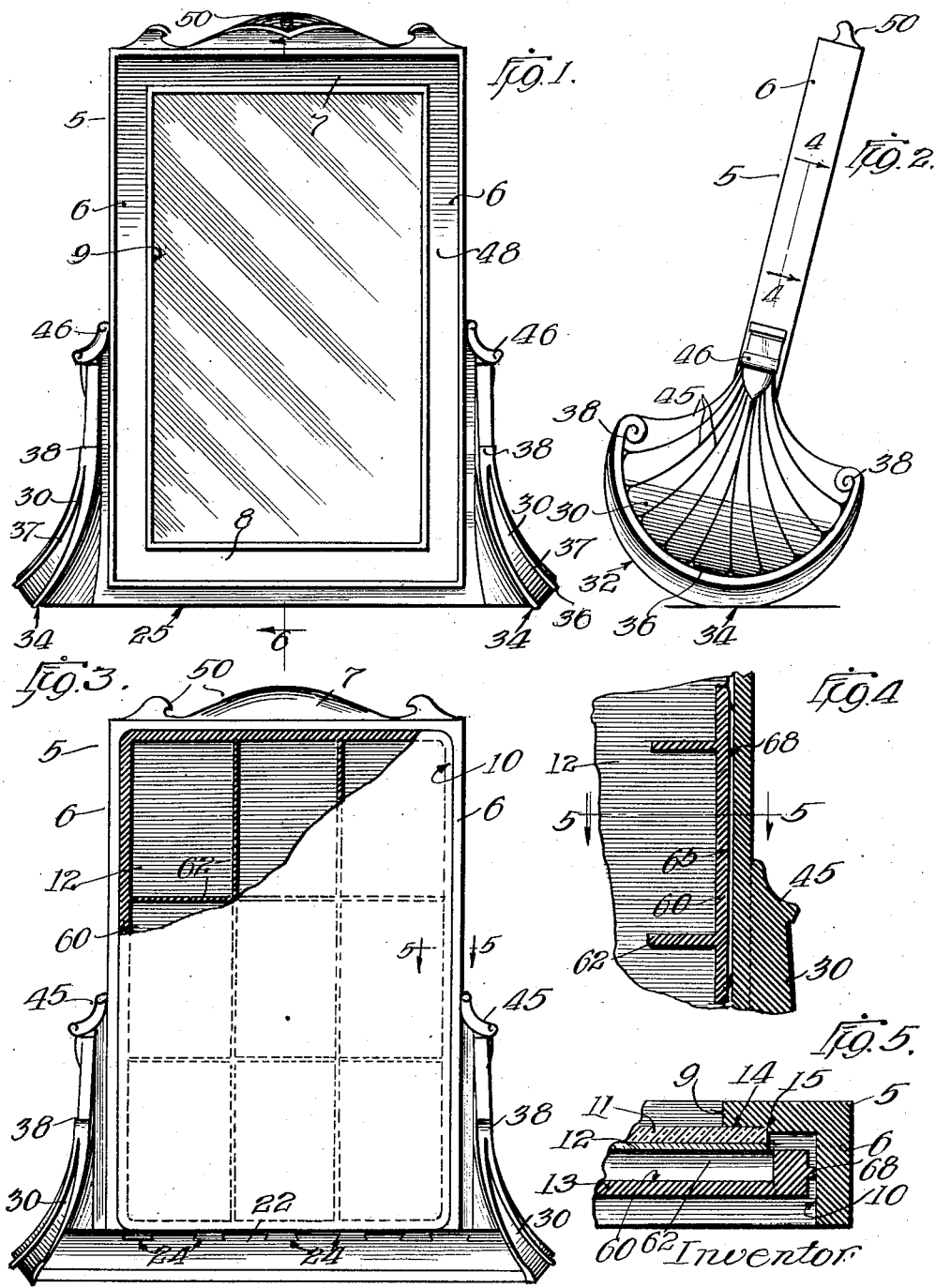

Patented Dec. 17, 1929

1,740,203

UNITED STATES PATENT OFFICE

JOHN B. SANBORN, OF FARMINGTON, CONNECTICUT

PICTURE FRAME

Application filed April 30, 1928. Serial No. 273,833.

This invention relates to picture frames, more particularly to picture frames of the easel frame type and its object is to provide for retaining or maintaining the frame in a definite position and for returning it to said position in case it is tipped over or otherwise displaced therefrom.

The invention provides a frame of pleasing appearance and a generally improved and simplified construction that may be economically produced.

The invention further provides an improved back and an improved attachment therefor, which attachment will permit removal and attachment of the back with ease and convenience for the purpose of introducing or removing the picture from the frame.

The invention is illustrated in the accompanying drawings, in which:

Fig. 1 is a front elevational view of a picture frame embodying the present invention;

Fig. 2 is a side elevational view of the same;

Fig. 3 is a back or rear elevational view;

Fig. 4 is a fragmentary detail section taken on the line 4—4 of Fig. 2;

Fig. 5 is a fragmentary detail section taken on the line 5—5 of Fig. 4;

Fig. 6 is a vertical section taken on the line 6—6 of Fig. 1, showing, in dotted lines, one of the positions from which the frame will return to its definite position shown in full lines;

Fig. 7 is a sectional view taken on the line 7—7 of Fig. 6;

Fig. 8 is a view showing, in full lines, the frame tipped over on one side or edge and in dotted lines more or less illustratively the manner in which the frame is returned to its definite upright position; and Fig. 9 is a fragmentary view of one side or edge of the back member.

Referring to the drawings, the frame shown comprises an open generally rectangular frame proper 5 having upright sides 6, 6, top 7 and bottom 8. It is to be understood, of course, that the present invention is not limited to any particular configuration of the frame and it may be oval, round, square, rectangular or of any other desired shape.

At the front the frame 5 defines or borders the opening 9 through which the picture is viewed and at the back of the frame the picture opening is enlarged at 10, as shown in Figs. 3, 5 and 6, to receive the protecting glass or pane 11, picture 12 and back 13 and to provide the retention or seating flange 14 around the front of the opening 10. The opening 10 is set in at 15 at its forward end and along the sides 6 and top 7 to receive and position the protecting glass pane 11. This disposes the glass close to the front of the frame without weakening the frame.

The frame is preferably molded of "bakelite", which is, as well known, a phenol product of condensation. I find that this material provides a simple construction at low cost. It also provides a frame of relatively light weight and it has the requisite structural strength and will not warp, shrink or become distorted. This material also possesses a certain inherent yieldability, which I employ in connection with the attachment of the removable back 13.

The bottom 8 is enlarged rearwardly at 20, as clearly shown in Fig. 6 and molded in this enlarged bottom 20 is a frame weight 22 shown in Fig. 7.

The upper surface of the weight 22 has intersecting grooves or mortises 24, which may be of slightly dove-tail formation, as shown in Fig. 3, and these grooves or mortises 24 interlock with the "bakelite" material which is molded upon the weight 22. The opposite ends of the weight 22 are enlarged at 22'. The bottom of the supporting base 20 is flattened off to provide a supporting surface 25 and the center of gravity of the weight 22 is preferably disposed to retain or maintain the frame 5 substantially in the position shown in Figs. 2 and 6, upon the supporting surface 25 and to return the frame to this position in case it is tipped over or otherwise displaced therefrom.

In order to permit the frame weight 22 to return the frame to the normal upright position shown in Fig. 2 from substantially any tipped or displaced position the bottom of each of the opposite sides of the frame are provided with generally fan-shaped runners or rockers 30. Each of these runners or rockers 30 has a suitably curved runner or rocker edge 32, these runner or rocker edges 32 being preferably curved from end to end except for the flat portions 34, which are aligned with and coincide transversely of the bottom of the frame with the flat supporting surface 25 upon which the frame is normally positioned and which with the center of gravity of the weight 22 determines the definite position of the frame. The curved runners 32 are also flared outwardly toward their lower ends at 36. The outward flaring is indicated at 37 in Fig. 1 and it is such that the outer lower ends 36 are disposed out of the plane of the upper ends 38. The flaring at 37 is such that in the event the frame is tipped over upon one side or edge, as shown at A in Fig. 8, the runner 30 presented to the supporting surface will not so engage the support as to retain the frame on edge. The flared and curved formation of the runners will guide the frame over into position upon its bottom from any displaced position, the weight 22 with the disposition of its center of gravity providing the means for moving the frame over these runner supports back into the definite position shown from any tipped over or displaced position. For example, I have shown, in Fig. 8, the frame moved first generally into the position B from the displaced position A and then rocked from the position shown generally at B to the definite or normal upright position indicated at C. The formation of the runners 30 and the disposition of the center of gravity of the weight 22 are preferably such as to return the frame to its definite or normal position from substantially any displaced position. For example, where the frame is simply displaced forwardly or rearwardly, as might be indicated by the position B in Figs. 6 and 8, the weight 22 merely rocks the frame upon the two runners 30 from its forwardly or backwardly displaced position into its normal definite position. In the particular embodiment shown the back 40 of the weight 22 is shown at an oblique angle to the top or upper surface of the weight and this oblique back 40 which may be coated or finished as desired, is disposed generally vertically in the normal or definite position of the frame.

The outer surfaces of the runners or rockers 30 may be fluted at 45, as shown in Fig. 2, or otherwise trimmed or finished to give a pleasing appearance and may be additionally finished or trimmed at 46, all of this trimming or finishing being preferably such that it will not present surfaces which might engage the support on opposite sides of the center of gravity of the weight in a tipped over or displaced position of the frame in such manner as to support the frame in this position and prevent its return to its normal or definite position. The front surfaces of the top, bottom and sides of the frame may also be suitably finished at 48, as desired, and may be additionally ornamented, as desired, as for example, indicated at 50 in Fig. 1. Even in the event the frame is set completely upside down and upon its top 7 the weight 22 will cause the frame to turn over upon its runners 30, whereupon it will rock upon these runners back to its normal or definite position.

The back 13 is also preferably of "bakelite" and one of its surfaces is provided with an integral marginal rib 60 extending marginally or peripherally around the same and with a plurality of integral intersecting ribs 62 across the same surface and preferably extending substantially the same distance as the marginal rib 60. The ribs 60 and 62 reinforce the back 13 over its entire area and permit an exceedingly thin construction of the main body of the back. In assembling the back the ribbed surface is preferably presented inwardly or forwardly to provide a smooth exposed back surface, although this may be varied.

The width of the back 13 is substantially equal to the width of the opening 10 and the height of the back is substantially equal to the height of the opening 10, so that the back fits relatively snugly therein. For the purpose of retaining the back in the opening when it is inserted therein and against accidental displacement therefrom the opposite side edges 65 of the back are provided with slightly raised longitudinal beads 68 which frictionally engage the adjacent inner surfaces of the frame and hold the back 13 securely in place. The beads or longitudinal tongues 68 are preferably integral with the back 13, and are raised only slightly and the inherent yieldability of the material of the back 13 together with the yieldability of the frame material permits more or less of a springing of these retention beads into the frame and an effective frictional cooperation therewith. The adjacent surfaces of the frame might even be provided with cooperating beads or grooves, although I have not found this necessary. These retention beads 68 may, of course, be provided on any or all edges of the back 13, instead of only upon the opposite upright or side edges thereof.

From the foregoing it will now be apparent that the frame is balanced in its normal or definite position, as shown in Fig. 2 and is normally retained in said position by the weight 22. While, of course, there might, under some circumstances, be more than one definite position, the frame is preferably unbalanced in every other position than that shown in Fig. 2, and is returned from any other position to its definite position by the weight 22, the runners or rockers 30 guiding the frame from any displaced position to its definite position and being formed so that they will not, in any displaced position of the frame, that is, either on one edge or on the front or back, hold the frame against being returned to its definite position by the weight 22. The runners cooperate with the weight 22 in guiding the frame from any displaced position to its definite position and the center of gravity of the weight 22 is disposed to return the frame from any displaced position to its definite position.

In order to remove the protecting glass pane 11 and back 13 for the purpose of removing or introducing a picture into the frame, all that is necessary is to exert a slight pressure upon the front of the glass pane 11 sufficient to overcome the frictional retention engagement of the retention beads 68 with the adjacent inner surfaces of the upright side portions 6 of the frame, and these parts may be replaced by introducing them into the frame and pressing them back into place.

I claim:—

1. In combination, an easel frame, a base having a rocker support for said frame, and weight means disposed on the base for retaining the frame in a definite position, said support means curved about at least two axes, one transverse to the other, and said weight means being disposed on said base so as to lie opposite the frame relative to said axes, whether the frame be tipped forwardly, rearwardly, or edgewise tilted positions.

2. In combination, an easel frame, means for retaining said frame in a definite position and for returning same to said position, and a rocker support for said frame, said rocker support comprising runners on opposite sides of the bottom of the frame, said runners being curved in a direction across the plane of the frame and flared outwardly in a direction edgewise of the frame.

3. In combination, an easel frame, means for retaining said frame in definite position and for returning same to said position, and a rocker support for said frame, said rocker support comprising runner means with the curvature of said runner means interrupted to provide a definite supporting position for the frame, said runner means being curved in a direction across the plane of the frame and flared outwardly in a direction edgewise of the frame.

4. In combination, a frame, a runner support for said frame, said runner support being curved in a direction across the plane of the frame and flared outwardly in a direction edgewise of the frame, and means for retaining said frame in upright position, and for returning same to said position from forwardly, rearwardly and edgewise tilted positions.

5. In combination, a frame, a base for said frame, a runner support curved in a direction across the plane of the frame and flared outwardly in a direction edgewise of the frame, and weight means embedded in said base for retaining said frame in upright position and for returning the frame to said position from forwardly, rearwardly and edgewise tilted positions.

6. In combination, a frame, a base for said frame, a runner support curved in a direction across the plane of the frame and flared outwardly in a direction edgewise of the frame, and weight means embedded in said base for retaining said frame in upright position and for returning the frame to said position from forwardly, rearwardly and edgewise tilted positions, said weight means being grooved and enclosed by said base.

7. In combination, a frame, a pair of runners one at each of the opposite ends of the base of the frame, said runners being curved in directions across the plane of the frame, and each flared outwardly edgewise of the frame, and means for retaining said frame in upright position and for returning same to said position from forwardly, rearwardly and edgewise tilted positions.

8. In combination, a frame, a rocker support for said frame, said rocker support being flared outwardly in a direction edgewise of the frame, and means for retaining said frame in upright position and for returning same to said position from tilted positions edgewise relative the frame.

In witness whereof, I have hereunto subscribed my name this 10th day of February, 1928.

JOHN B. SANBORN.